June 4, 1963 D. V. REID 3,092,060
FLYING SUBMARINE
Filed Jan. 17, 1958 3 Sheets-Sheet 1
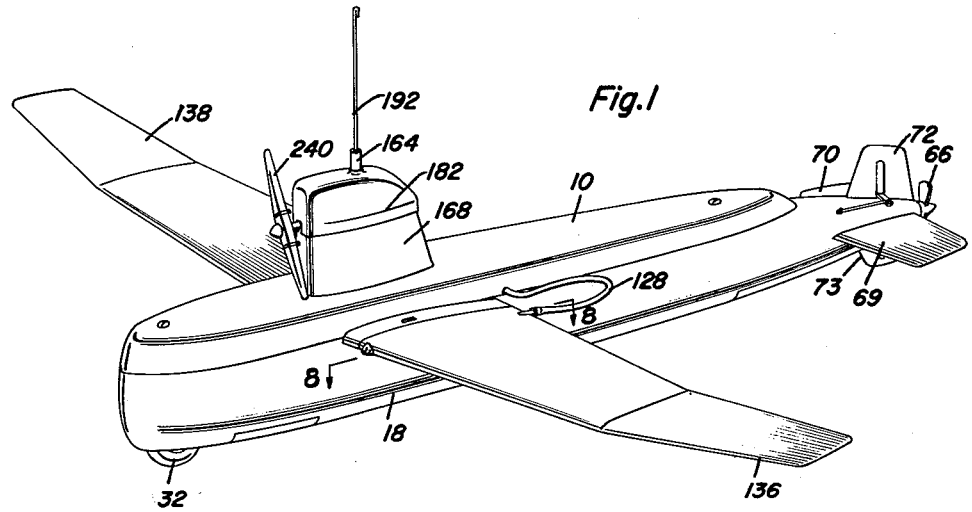
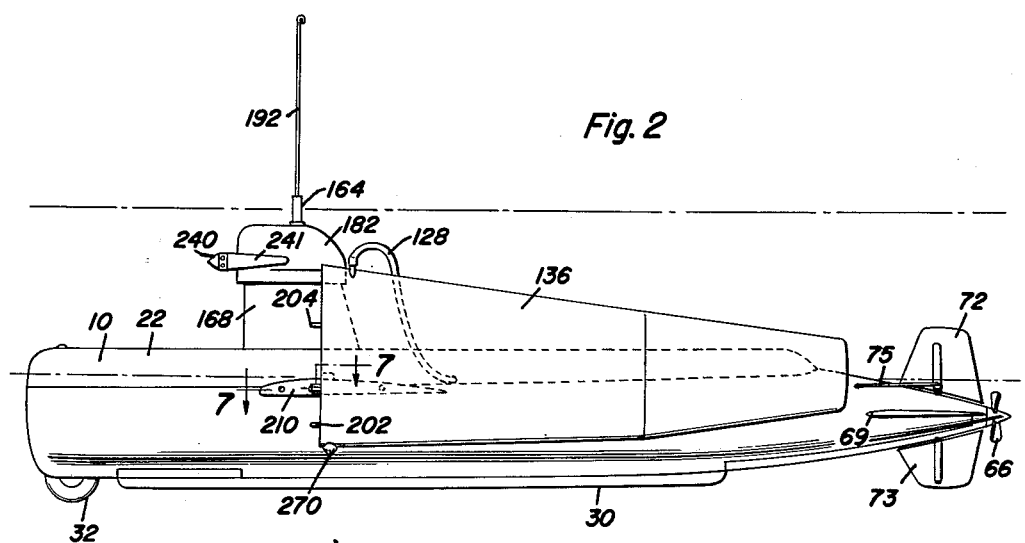
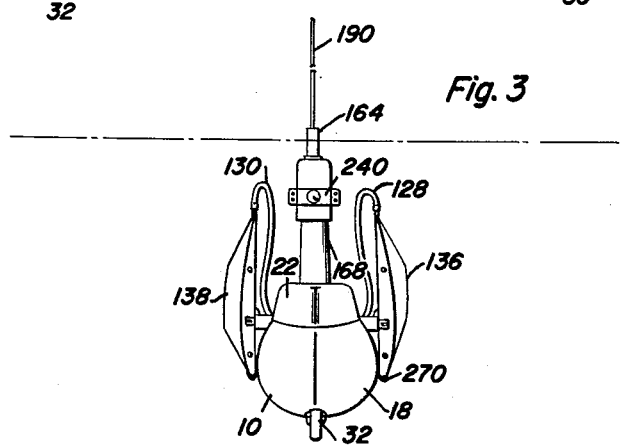
Donald V. Reid
INVENTOR.

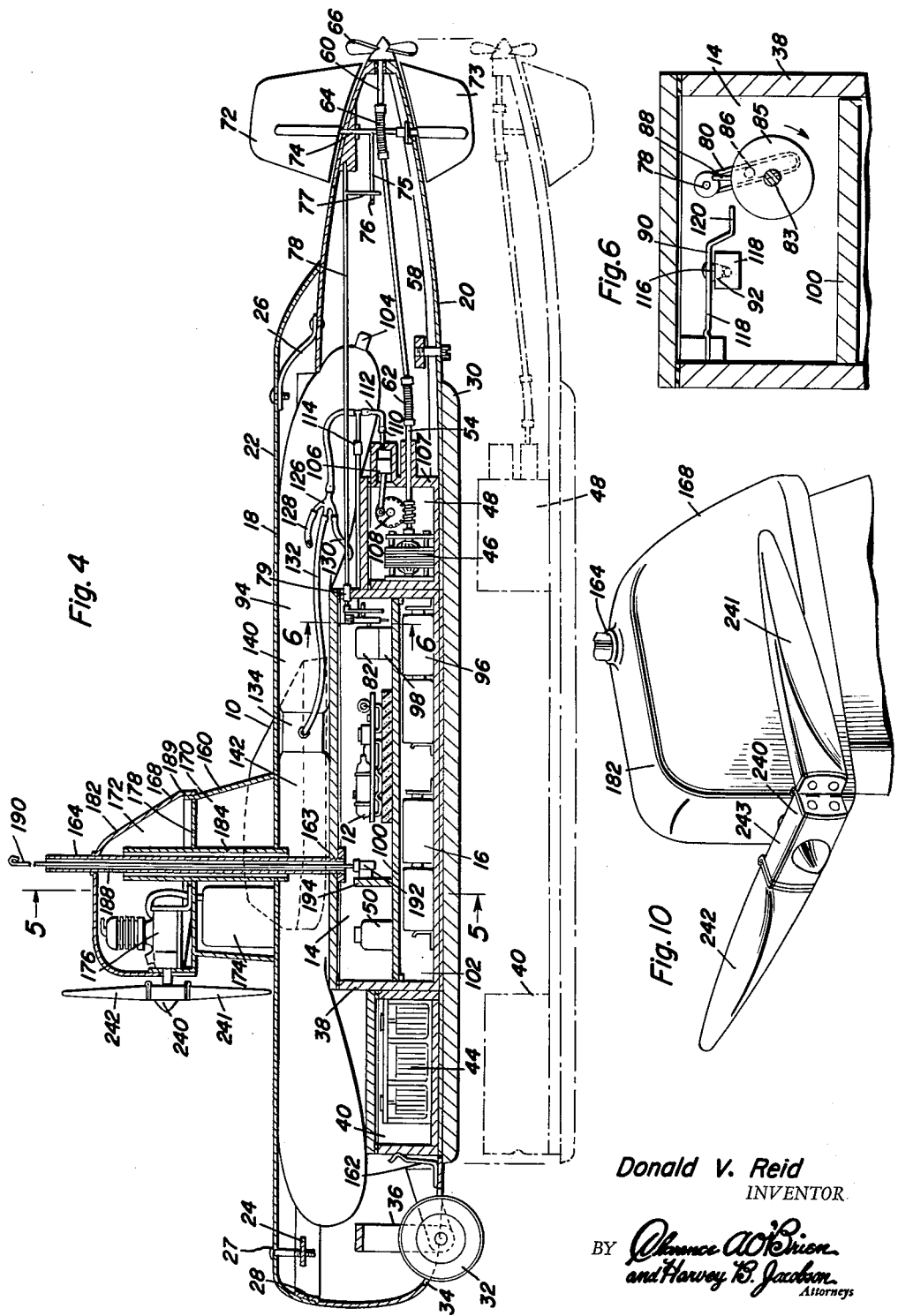

June 4, 1963  D. V. REID  3,092,060
FLYING SUBMARINE
Filed Jan. 17, 1958  3 Sheets-Sheet 3
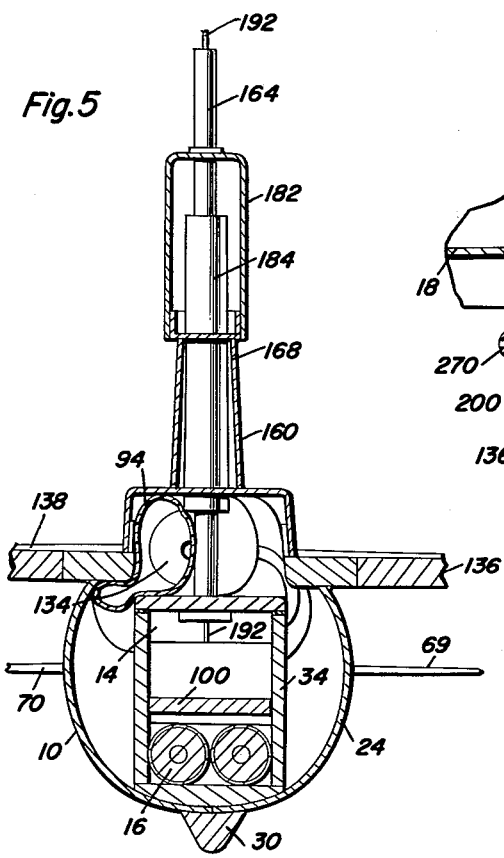
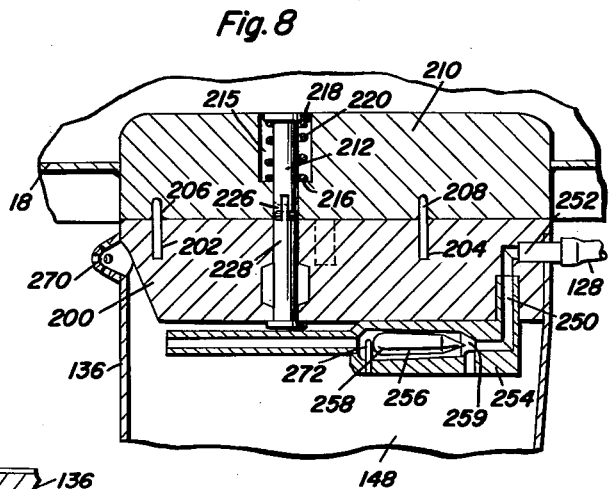
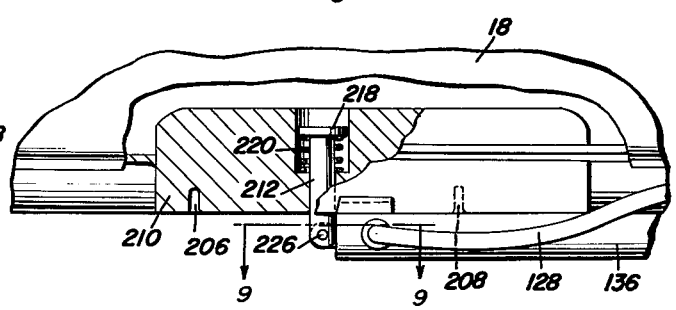
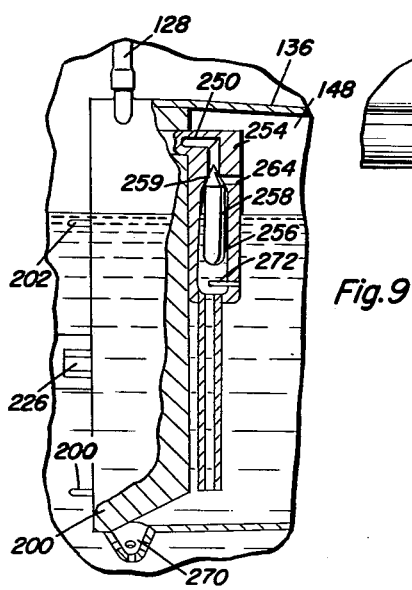
Donald V. Reid
INVENTOR.
BY *Clarence A. O'Brien*
*and Harvey B. Jacobson*
Attorneys //
United States Patent Office 3,092,060
Patented June 4, 1963

3,092,060
FLYING SUBMARINE
Donald V. Reid, 1315 Evergreen Ave.,
Wanamassa (Asbury Park), N.J.
Filed Jan. 17, 1958, Ser. No. 709,588
5 Claims. (Cl. 114—16)

This invention relates to a combined airplane and submarine and more particularly to a submarine airplane which may be constructed as a hobbyist's model or as a full scale craft having principal although not exclusive application as a military vehicle.

An object of the invention is to provide a submarine airplane which is capable of easily converting from a vehicle capable of submerged propulsion to an aircraft. The submarine airplane can be radio operated for elevation control purposes, this being particularly advantageous in the hobbyist's embodiments of the invention. On the other hand, when used as a full scale airplane, submarine or water surface craft, standard controls for both the airplane and the submarine will be used in connection with the other usual directional and propulsion control functions. The invention has many other applications and these will become manifest to those skilled in the art of war or suppliers of military equipment.

There are many other advantages and benefits to be derived from this invention. All uses that reasonably occur to those skilled in the art may be made of the invention without departing from the appended claims. In the drawings there are illustrated exemplifying embodiments of the invention, wherein:

FIGURE 1 is a perspective view of a typical submarine airplane shown in the flight adjustment.

FIGURE 2 is a side view of the submarine airplane of FIGURE 1 showing the same in both the surface and submerged positions by illustration of two water lines.

FIGURE 3 is a front view of the submarine airplane of FIGURE 1 showing it in the submerged condition by the illustration of the water line.

FIGURE 4 is a longitudinal sectional view of the submarine airplane and showing in dotted line representation the drive mechanism only.

FIGURE 5 is an enlarged sectional view taken on the line 5—5 of FIGURE 4.

FIGURE 6 is an enlarged sectional view taken on the line 6—6 of FIGURE 4 and showing a part of the rudder controls and air bag valve.

FIGURE 7 is a sectional view taken on the line 7—7 of FIGURE 2 and showing the way that the wings are attached to the hull of the submarine airplane.

FIGURE 8 is a sectional view showing a valve in one of the wings, this valve functioning as a ballast control but enabling the air to be pumped out of the wing so that the submarine will surface.

FIGURE 9 is a sectional view taken on the line 9—9 of FIGURE 7.

FIGURE 10 is a fragmentary perspective view showing principally the folding blades of the propeller used for flight.

The described embodiment of the invention may be radio operated by a radio transmitter and receiver elevational control purposes including submerging, surfacing, and altitude changes. For the hobbyist, the submarine airplane 10 has a radio receiver 12 in electronic's compartment 14 together with batteries 16 to power the receiver. Receiver 12 is a standard receiver designed to operate on 27.255 megacycles, however, other radio receiver channels may be used.

Hull 18 is made in sections 20 and 22 that are adapted to be fastened together by the hobbyist. One or more internal ribs 24 are attached to section 20 and extend transversely across the hull. They have bolts 27 which pass through holes in hull section 22, engaged with them. Bracket 26 is attached between the sections to aid in holding them assembled. In addition there are interlocked flanges 28 that extend fore and aft of the hull sections and constitute a seam after the sections are joined. Keel strip 30 is bolted or otherwise attached to the bottom of the hull section 20 with the weight alterable in accordance with the necessities of each airplane submarine. Nose wheel 32 is located forward with a part in an opening 34 of hull 18 and is carried by a wheel support 36.

Compartment 14 is enclosed by a waterproof casing 38 so that air under pressure may be maintained therein and supplied thereto in a manner to be described hereafter. Compartment 40 that is made either as a part of casing 38 or as a separate and attached compartment, contains storage batteries 44. As shown by the dotted line part of FIGURE 4, the storage batteries constitute a part of the main drive for the submarine airplane when it is used as a surface or subsurface craft. Electric motor 46 is mounted in waterproof compartment 48 in the hull and is controlled by switch 50. Drive shaft 54 is actuated by electric motor 46 and has two sections 58 and 60 driven by it and operatively connected with shaft 54 by universal joints 62 and 64. These may be of a number of configurations, one being torsion springs. The aft end of section 60 so driven or driven in any other suitable manner, has a propeller 66 by which to move the craft forward when it is used either on the surface or below the surface of the water.

Horizontal stabilizers 69 and 70 are attached to the aft part of the hull while rudders 72 and 73 are located as an empennage assembly for flight and as rudders for surface and sub-surface travel when the craft is used as a submarine all of these elements being associated with the standard control systems aforementioned unless the device is in the form of a hobbyist's model. However, as a submarine craft additional control of the rudder is provided. Spindle 74 is attached to the two rudders 72 and 73 and passes through aligned bearings in the aft part of the hull. Control arm 75 is secured to spindle 74 and has a ring 76 at its inner end into which arm 77 passes. This arm extends from a torsion bar 78 mounted in bearings 79 which exclude water from compartment 14. Bearing 79 can be a small stuffing box. By rotating the torsion bar clockwise and counterclockwise, arm 75 turns the rudders 72 and 73 for starboard and port maneuvering. Loop 80 is secured to the inner end of torsion bar 78 and is disposed in compartment 14. Servomotor 82 has a shaft 83 extending from it and to which wheel 85 is secured. Pin 86 is secured to a face of the wheel and is located in the loop 80 so that as the output shaft 83 of servomotor 82 rotates the loop 80 will be oscillated thereby causing clockwise and counterclockwise rotation of torsion bar 78. For each revolution of output shaft 83 there will be two neutral positions for the rudders and a single starboard and a single port position. At one of the neutral positions at which the servomotor shaft 83 may be held upon receipt of a proper signal by the servomotor, a cam, pin 88 or the like that is carried by wheel 85, strikes valve operating arm 90 causing the valve 92 to open. The purpose of valve 92 is to exhaust air from the ballast tank 94 and is accordingly connected to the return line 114 by a connection in wall 38 located behind bearing 79 as viewed in FIGURE 4.

Servomotor 82 is a standard hobbyist's item that has been commercially available for a number of years. It operates on power from batteries 96 that are safely carried in the waterproof chamber 14. Remotely controlled relay device 98 is arranged to control the servomotor 82 with the input signal taken from radio receiver 12 operative to stop the servomotor shaft 83 at a selected position either to hold the rudders 72 and 73 in a fixed position for steering purposes or to hold the valve 92 open to deflate the ballast 94 for submerging purposes. Remote control systems, the details of which form no part of the present invention, for selectively stopping control members are well known as shown for example in Patent No. 1,766,524. The casing 38 and the compartment 14 formed by it are deemed to be a unique arrangement when housing the various drive parts on horizontal partition 100 with the battery compartment 102 therebelow. However, the radio receiver, servomotor 82, relay 98 and the electrical connections between themselves are not new.

Ballast tank 94 is enclosed in the hull 18 and is located generally above the chambers 14, 40 and 48. The ballast tank is expansible and is made of either plastic or rubber. It has a safety relief valve 104 which momentarily opens in response to pressure beyond a safe limit in the ballast tank. A small pump 106 is attached to a wall 107 of chamber 48 and may be of the diaphragm or piston type. A transmission 108 changes rotary motion from the output shaft 54 of the electric motor 46 to reciprocating motion for the piston or diaphragm of the pump. Transmission 108 is mechanically simple, for example a gear enmeshed with a worm that is fixed to shaft 54. The piston rod is attached to a face of the gear by a crank pin so that the pump 106 will be actuated at all times during the rotation of the output shaft of motor 46. Check valve mechanism 110 is in the outlet line 112 of pump 106 so that there will be a pumping action to withdraw air from any suitable supply stored within the hull during the suction stroke as is well known to those skilled in the art and discharging the air under pressure to force it into the ballasts for inflation thereof through the line 112 when the return line 114 is blocked. The return line 114 is passed through an opening in the end wall of casing 38 and is connected to valve 92 having a valve seat 118 (FIGURE 6) connected to the return line. The valve seat is closed by a valve element 116, the latter carried by resilient arm 90. The resilient arm is anchored at one end and has a finger 120 at its opposite end. The bias of the spring arm 90 is in a direction tending to seat the valve element 116 in the valve seat. In order to prevent inflation of the ballasts or to deflate the inflated ballasts, the cam or other projection, as pin 88, rotates with the servomotor operated wheel 85 (as previously described) the pin 88 contacts finger 120 and lifts the valve member 116 from its seat 118 in order to hold the valve 92 continuously open and thereby exhaust line 112 and the ballast tank 94 into chamber 14. The air inlet line for ballast tank 94 has a fitting 126 in it to which air conductors 128 and 130 are connected. The main line 112 continues by air conductor 132 that is attached to fitting 126 (FIGURE 4) and connects with an inlet in neck 134. The conductors 128 and 130 attach to the two wings 136 and 138 (FIGURE 3) to blow out the water from the wing cavities or chambers. Neck 134 connects two receptacles 140 and 142 which combine to form the ballast tank 94. It is now evident that when the pump 106 is operated in response to actuation of the main drive electric motor 46, air will be pumped into the ballast tank 94 and into the two chambers or cavities 148 of the two wings 136 and 138. Should too much pressure be developed in the ballast tank 94, it will be relieved through the pressure relief valve 104. The buoyancy of the craft is such that it will be at flotation level with the ballast tank plus the wing cavities full with air under pump pressure. To submerge, the radio receiver accepts a signal from a remote transmitter and causes the servomotor 82 to be operated through the intermediate actuation of relay 98. Wheel 85 is rotated thereby directionally controlling the rudders, but at the same time enabling a neutral position (rudders straight or parallel to the longitudinal axis of the craft) at which the valve 92 is opened thereby exhausting the air from the cavities 148 and ballast tank 94 and enabling the ballast tank to collapse due to the water pressure within the submarine hull. Accordingly, the submarine airplane no longer floats but submerges. The opening 34 at the front of the hull permits water to enter the hull. Vent openings may be placed anywhere in the hull to relieve any possible air pockets that may be formed between the surface of the ballast tank 94 and the inside surface of the hull. This may be necessary near the conning tower or sail 160 of the submarine airplane.

Casing 38 together with the motor and battery chamber forming casings are each waterproof receptacles held in place within the hull by spring clips 162 or like fasteners. Opening 163 is in the top wall of chamber 14 and has a snorkel tube 164 tightly fitted in it by threading and liberal use of cement or some other substance for achieving a watertight seal between the snorkel tube and the wall of casing 38. Snorkel tube 164 extends through an opening in the top section 18 of the hull and through openings in the sail 160. The sail is formed by a housing 168 having a lower compartment 170 and an upper compartment 172. The lower compartment is adapted to contain a supply tank 174 of fuel for internal combustion engine 176. The engine is carried in the upper compartment 172 by being mounted on the compartment separating partition 178. Snorkel tube sleeve 184 is concentric with a portion of the snorkel tube and opens into engine compartment 172. An aperture 188 is in the side wall of the snorkel tube and also registers with the engine compartment for air induction. The entire upper part 182 of the housing can be removed from the lower stationary part when the owner wishes to do so or it can be semipermanently held in place, as by applying grease to the overlapped flanges 189 of the upper and lower sections of housing 168.

The radio antenna 190 is passed through the center of the snorkel tube and fits in an antenna socket 192 that is supported by a bracket 194 in chamber 14. The socket 192 is wired with the radio receiver. Antenna 190 can remain in place in all propulsion activities of the craft. However, when used as an airplane, engine 176 is required. When used as a surface water craft or submarine, the electric motor 46 is used.

The craft 10 is provided with supplemental buoyancy devices to assist in the operation of the craft as an underwater vehicle. Accordingly in order to sustain flight and in order to function as ballast tanks, there are two wings 136 and 138 whose selection is made from standard NACA sections. Considering first the flight aspect, the wings will be extended as shown in FIGURE 1. To retain them in the extended position the structure shown in FIGURES 7, 8 and 9 will be used. The root ends of each hollow wing are constructed the same. Therefore, wing 136 only is detailed. It has a root end spar 200 with a pair of spaced pins 202 and 204 that fit into sockets 206 and 208. These sockets are on the wing mounting stub 210 fixed to the side of the hull 18 and are accompanied by spring loaded plunger 212 that is located in recess 215 having shoulder 216 in it. Plunger 212 has a head 218 against which spring 220 reacts. The opposite end of the spring is seated on shoulder 216 thereby applying a yielding bias to the plunger 112 at all times. Hinge 226 attaches the stud 228 to the plunger 212. Stud 228 is fixed to the root end spar 200 of wing 136. In use, the wings are held in the extended position by the force of spring 220 pulling the wing inwardly toward the hull and with the pins 202 and 204 securely seated in their sockets 206 and 208, the wing cannot tilt or rotate. However, when the wing is pulled outwardly from the hull sufficiently far to release the pins 202 and 204 from their sockets, the entire wing can be rotated about the longitudinal axis of the plunger 212 and folded back against the sides of the hull (see FIGURES 2 and 3). The wing 136 will retain this position by the overcenter action of the spring 220, plunger 212, stud and hinge 226.

When used as an aircraft, additional control surfaces such as movable wing flaps operatively connected with the wings may be provided. These will be radio controlled with the control achieved in a similar manner as the control is obtained for the rudders 73 and 72. Such wing control is well known in the art and hence forms no part of this invention and is therefore not shown herein. In addition, the propeller 240 that is attached to the shaft of engine 176 will have its blades 241 and 242 pivoted to the hub 243. For flight, the blades will be hinged forward and locked in place by one or more pins. Should centrifugal force be enough to hold the blades 241 and 242 extended from the hub 243, this force alone may be relied on. Moreover, it is within the purview of the invention to have the propeller made separable from the engine shaft so that the propeller can be removed when the submarine airplane is used only as a water craft. When used as an aircraft, the submarine airplane is amphibious capable of landing on land or on water.

The wings 136 and 138 are of considerable importance insofar as their function is concerned. Since the submarine airplane is a heavier-than-air craft, the wings are necessary to sustain flight. However, they are very useful in providing buoyancy by having the air pumped into them and ballast by having the water drawn into them during flotation and submerging respectively. Therefore each wing has a valve control for pumping it down. Wing 136 has a passageway 250 with a neck 252 extending from it and to which the air conductor 128 is attached. The passageway is constructed as a tube 254 located in the cavity 148 of wing 136. A valve chamber 256 is formed as an enlargement of the bore of tube 254 and contains a buoyant valve element 258. Valve seat 259 is closed by the pointed end of the valve element 258 by flotation (see FIGURE 9) thereby sealing the passageway 250 and hence, thereby sealing the air conductor 128 when the wing 136 is filled to its capacity with water. Lateral air passage 264 is in tube 254 permitting air to build up in cavity 148 above the water level. Sump 270 is in the wing 138 at its leading edge and will be the lowest part of the wing when folded back against the hull. Valve element stop 272 is attached to the tube 254 and protrudes at least partially across the valve chamber 256 to limit the movement of the buoyant valve element 258 in one direction. The opposite direction has its limit established by valve seat 259.

In operation of the flotation and ballast features of the submarine airplane's wings, it is assumed that the wings are folded back against the hull and they are purged of water. The submarine airplane is then placed in the water and soon the wings have their cavities 148 filled to the level established by the closing of buoyant valve 258 since this shuts off the air outlet for the water that enters the plurality of apertures in sump 270. At the same time water flows into the hull of the submarine airplane and it will assume a submerged position. Now, operating the pump 106 will inflate the ballast tank 94 making the entire craft more buoyant. At the same time air under pressure from pump 106 passes through air conductors 128 and 130 and enters the passages 250 of each wing. This air under pressure blows the valve elements 258 of each wing downward a distance sufficient to communicate the port 264 with the passageway 250. Hence, pressure builds up above the water level in the cavities 148 and this exhausts water through sump 270 thereby blowing down the wings and evacuating them of water. Therefore, the water ballast from each side of the hull is removed in equal amounts from the wings. Submarine airplane 10 now surfaces and can be operated on the surface of the water or submerged by remote (radio) control in the manner previously described.

To be used as an aircraft, the propeller blades are taken from their position which they assume flush alongside of the sail or conning tower and extended and latched in the extended position. Alternatively, if centrifugal force alone is relied on to hold the propeller blades extended, the engine 176 is operated to cause the propeller blades to swing outwardly. Before doing this, though, the wings are adjusted to the lateral positions so that they can function as lift producing devices and thereby sustain flight of the heavier-than-air craft.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A craft for traveling through two different fluid mediums comprising, supporting body means, buoyancy control means mounted within the body means for controlling the position of the body means within one of the fluid mediums in accordance with the pressure thereof, dynamic lift means operatively connected to the body means for controlling the position of the body means within the other fluid medium, supplemental buoyancy means operatively mounted within the dynamic lift means and selectively rendered operative to supplement the buoyancy control means when exposed to said one fluid medium and means for rendering the supplemental buoyancy means inoperative when the body means is disposed within said other fluid medium and propulsion means mounted in the body means operative to render the lift means effective when the supplemental buoyancy means is inoperative.

2. The combination of claim 1 wherein said body means is a hull and said dynamic lift means includes a pair of wings on said hull, said supplemental buoyancy means comprising cavities in said wings, and air conducting means operatively connected with said cavities, said cavities each having an opening through which as said one fluid medium water may pass, and valve means operatively connected to said air conducting means for controlling the admission of air as said other fluid medium into said cavities whereby said cavities may be pumped down of water by the application of pump pressure above the water level in said cavities to flush the water through said openings of said cavities.

3. The combination of claim 1, wherein said one fluid medium is water and said other fluid medium is air, said dynamic lift means comprising foldable airfoil members disposed in a folded position against said supporting body means for underwater and water surface travel and in an unfolded position in laterally extended relation to said supporting body means to present aerodynamic lift surfaces for air travel.

4. The combination of claim 3, wherein said supplemental buoyancy means comprises chamber means formed in said foldable airfoil members having an outlet exposed to water in the folded position of the airfoil members to receive water therewithin and exposed to air in the unfolded position for purging water therefrom.

5. The combination of claim 4, wherein said means for rendering the supplemental buoyancy means inoperative comprises, passage means operatively mounted within said chamber means for exposure to both water and air within the chamber means in the folded position of the airfoil members only, flotation valve means operatively mounted within said passage means and rendered operative by water in the passage means to control the admission of air into the chamber means and inoperative upon exposure of the passage means to air only in the unfolded position of the airfoil members.

References Cited in the file of this patent

UNITED STATES PATENTS

| | | |
|---|---|---|
| 863,532 | Hector | Aug. 13, 1907 |
| 896,613 | Behrmann | Aug. 18, 1908 |
| 1,286,679 | Longobardi | Dec. 3, 1918 |
| 1,361,785 | Tucker | Dec. 7, 1920 |
| 1,421,369 | Ardo | July 4, 1922 |
| 1,496,723 | Miller | June 3, 1924 |
| 1,579,109 | Haseley | Mar. 30, 1926 |
| 1,974,884 | Von Opel | Sept. 25, 1934 |
| 2,191,879 | Dunajeff | Feb. 27, 1940 |
| 2,252,342 | Finley | Aug. 12, 1941 |
| 2,388,247 | Berkow | Nov. 6, 1945 |
| 2,413,350 | Helmore | Dec. 31, 1946 |
| 2,441,568 | Finison | May 18, 1948 |
| 2,444,332 | Briggs et al. | June 29, 1948 |
| 2,498,284 | Leonard | Feb. 21, 1950 |
| 2,599,484 | Rhodes | June 3, 1952 |
| 2,609,660 | Tenney et al. | Sept. 9, 1952 |
| 2,720,367 | Doolittle | Oct. 11, 1955 |
| 2,742,735 | Sommerhoff | Apr. 24, 1956 |
| 2,788,184 | Michael | Apr. 9, 1957 |
| 2,887,977 | Piry | May 26, 1959 |

OTHER REFERENCES

Hawker Siddeley Review, issue of December 1956, pages 100 and 101.